United States Patent Office 3,361,835
Patented Jan. 2, 1968

3,361,835
PREPARATION OF 2-PHENYL-ALLYL-CHLORIDE
Willis C. Keith, Lansing, and Robert P. Zmitrovis, Park Forest, Ill., assignors to Sinclair Research, Inc., New York, N.Y., a corporation of Delaware
No Drawing. Filed May 13, 1965, Ser. No. 455,607
2 Claims. (Cl. 260—651)

This application is a continuation-in-part of application Ser. No. 301,168, filed Aug. 9, 1963, and now abandoned, which latter application is a continuation-in-part of application Ser. No. 138,299, filed Sept. 15, 1961, and now abandoned.

This invention is a method for the chlorination of α-methyl styrene to produce 2-phenyl-allyl chloride in good yields. The 2-phenyl-allyl chloride is a valuable intermediate for the preparation of synthetic resins and oil additives and may easily be converted to the corresponding alcohol, ester, and numerous other derivatives such as 1-cyano-2-phenyl-propene-1.

It has been found that α-methyl styrene may be chlorinated in the vapor phase to produce 2-phenyl-allyl chloride as well as other products and that the yield of the allyl chloride is maximized by the use of certain select elevated temperatures and contact times. In vapor phase chlorination, the following reactions may take place:

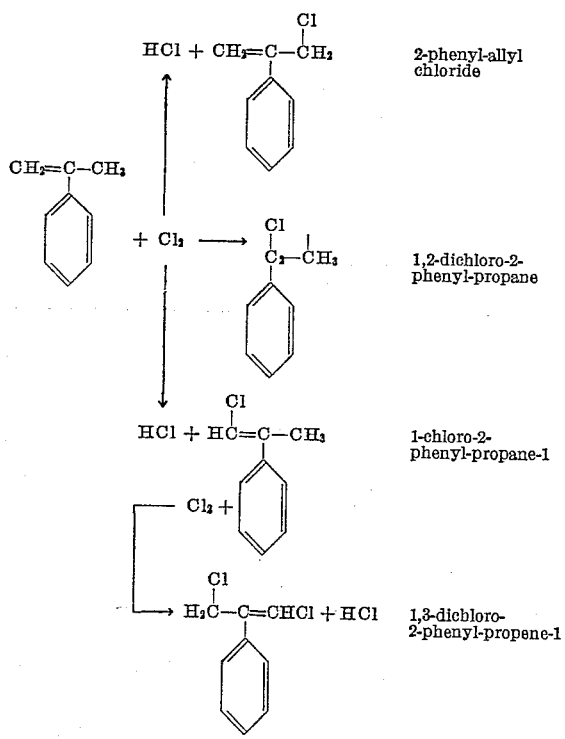

The process is operable to produce the allyl chloride at temperatures above the boiling point (165° C.) of the α-methyl styrene and below its decomposition temperature. However, it has been found that the product distribution is temperature and contact time dependent and that high selective yields of 2-phenyl-allyl-chloride can be obtained by operating at a temperature of about 475° to 550° C. and at an unusually low contact time of about 0.01 to 0.1 second. Use of a contact time much above 0.1 second significantly reduces the selectivity to 2-phenyl-allyl chloride. Likewise, operating at temperatures below about 475° F. at these low contact times fails to provide the desired selectivity to 2-phenyl-allyl chloride.

The vapor phase reaction can be carried out in the absence of a catalyst and a bed of inert solids may be provided to distribute the reactants and moderate the heating to prevent hot spots. The reaction is highly exothermic and good dissipation of the heat is advisable. The inert solids may be disposed as a fluidized bed. A fixed bed of solids may also be used for the reaction and the reactants may be passed through a fixed bed of inerts for preheating or cooling. Low pressure steam may be employed to quench the reaction to avoid substantial polymer formation but a water quench is preferred.

The feed to the process of this invention is α-methyl styrene which may contain an innocuous substituent such as alkyl of 1–5 carbon atoms, phenyl, halide of 9 to 53 atomic number, etc. The feed advantageously is a hydrocarbon.

The molecular chloride gas may be fed alone to the reaction but preferably an inert diluent, advantageously nitrogen or steam, is fed along with the chlorine and, if desired, along with the α-methyl-styrene as well. About 0.5 to 20 moles of α-methyl-styrene may be fed to the reaction per mole of chlorine, preferably 2 to 5 moles of hydrocarbon per mole of molecular chlorine gas. About 0.5 to 20 or more volumes of diluent may, if desired, be employed for each combined volume of chlorine and α-methyl styrene. As aforementioned, the time of contact of the reactants can vary from about 0.01 to 0.1 second, preferably about 0.02 to 0.08 second. The products of the reaction may be easily separated for recovery of the 2-phenyl-allyl chloride by fractional condensation or by total condensation and distillation.

The process of the invention will be better understood by reference to the following examples in which alpha-methyl-styrene and chlorine were reacted in vapor phase.

*Example I*

The reactor used was a small fluidized bed reactor which provided good control of reaction temperature. Three separately heated furnaces were used to provide good temperature control in a preheating, a reaction, and a quenching zone. The preheating zone was provided with a fixed bed of inerts, a porous dispersion plate between it and the reaction zone, and an entry for diluent gas and hydrocarbon reactant. The reaction zone was provided with silicon carbide particles in a fluidizable size and with a capillary tube for entry of chlorine and diluent just above the dispersion plate. The exit of the quenching zone was provided with an entry for low-pressure steam and with a tube which leads to a condenser.

The reactor was purged with diluent while being heated to the desired temperatures. The α-methyl styrene, plus a small amount of steam diluent, entered the fixed bed of inerts at the desired rate by means of a Milton Roy mini-pump. The feed was vaporized and preheated to reaction temperature and passed through the porous plate to the reaction zone. The molecular chlorine gas, also diluted with steam, was introduced at a constant rate by means of a low pressure regulator-flowmeter assembly, just above the dispersion plate, through the capillary tube, and the reaction mixture passed through the fluidized zone, to the quenching zone. The low pressure steam (about 100° C.) was turned on prior to the addition of chlorine, no attempt being made to adjust the steam other than to insure an ample quantity of water to quench the reaction. The reaction temperature was easily adjusted by regulating the furnaces for the pre-heat and reaction zone. The temperature was controlled within ±5° C. of the desired temperature. After the reactor was lined out the product was collected and worked up. The workup consisted of separating the organic phase from the water, followed by an additional washing with water to remove traces of HCl. The product was dried over Ca(SO₄)₂ and fractionated at a reduced pressure of 10 mm. absolute. The product was cut into four major fractions, namely:

(1) Unreacted α-methylstyrene
(2) Mono-chlorides
(3) Dichlorides
(4) Bottoms (polymer).

Fractions 2 and 3 were analyzed for percent chlorine and allyl-chloride content as indicated by etherification number. Other runs (2, 3 and 4) were conducted which used nitrogen as the diluent in the reaction. The results are tabulated below:

|  | Example No. | | | |
|---|---|---|---|---|
|  | 1 | 2 | 3 | 4 |
| Reaction Temp. (° C.) | 250 | 325 | 375 | 400 |
| Contact Time (sec.) | 2 | 1.75 | 2.62 | 1.70 |
| Mole ratio hydrocarbon to chlorine | 1.7 | 2.0 | 2.0 | 2.0 |
| Volume ratio diluent to reactants | 0.8 | 1.34 | 1.62 | 2.9 |
| Products (mole percent): | | | | |
| 2-phenyl-allyl-chloride | 33 | 33.5 | 66.6 | 80.8 |
| 1-chloro-2-phenyl-propene-1 and 1,2-dichloro-2-phenyl-propane | 67 | 66.5 | 33.4 | 20.0 |

The effect of temperature on product distribution is clearly illustrated by the above results. Very little change in product distribution takes place in going from 250° C. to 330° C. but an abrupt change in product distribution takes place as the temperature exceeds 330° C. The yield of 2-phenyl-allyl-chloride increases very rapidly as temperature increases. A plot of product distribution against temperature shows a fairly flat curve between 250° and 330° C. with a very steep increase after 330° C.

*Example II*

The following chlorinations of α-methyl styrene were made to illustrate that the high temperatures and shorter contact times of the invention provide surprisingly high selectivity of 2-phenyl-allyl chloride. In these reactions α-methyl styrene was pumped into a preheating coil. Chlorine from a cylinder was dried and fed into another preheating coil. The nitrogen used as diluent was fed in two equal streams into the two preheating coils. Two thermowells at the end of the preheaters allowed for measuring the temperature of the two feed streams which had salt bath temperature in all runs. The feed lines were connected to the reactor through a short piece of capillary tubing to avoid back-mixing. The reaction zone consisted of a tube having a concentric thermowell. The reactor volume was 4.65 ml. and the difference between the diameters of the reactor tube (ID) and the thermowell (OD) was 1.2 mm. At the end of one feedline and at the upper end of the reactor a 1 mm. ID capillary lead to a pressure gauge. A small bleed of nitrogen was used to avoid condensation of product in these capillaries. The preheaters and reactor were made of Inconel. A small stainless steel valve with prolonged stem was welded to the exit of the reactor and the valve was connected to a ¼" stainless steel tube used as the quench zone. At ½ inch from the valve, another ¼" stainless steel tube was attached to the quench zone to introduce the quench water. The preheaters, reaction zone and initial part of the quench zone were all submerged in a well-stirred salt bath kept at constant temperature. The reaction product was cooled to room temperature and collected in a product receiver. The liquid product was separated into an organic layer and an aqueous layer. The aqueous layer (about 3500–4000 ml.) was recycled as quench water (about 27° ml./min.). The vaporous reaction product in form of obnoxious white fumes was passed successively through a wash bottle containing water, through three large traps in Dry-Ice, the last one containing a "Demistor" pad to increase the surface, and through two towers containing each approximately 220 g. activated carbon. The exit nitrogen was saturated with water and its volume measured. A few check tests showed that the organic layer in the traps had the same composition as the main product. It was therefore assumed that this is also the case for the vapors adsorbed in the carbon tower. A total of approximately 2–3% of product was collected in traps and towers.

A prerun of approximately 200 ml. α-methyl styrene feed was made to get the system into equilibria, followed by a run of 210–220 ml. feed. The separated, hazy aqueous layer was heated to 40–50° C., 4–5 g. sodium chloride was added and the layer cooled to room temperature. An additional 4–15 g. product was recovered in this manner. A standard amount of 8 g. was added to the total weight due to unrecoverable losses in the quench water. The reaction product was then dried by shaking with Drierite. The chlorinated α-methyl styrene reaction product was analyzed by gas chromatography.

Data from such tests are reported in the following table:

TABLE

|  | Run No. | | | | | | | |
|---|---|---|---|---|---|---|---|---|
|  | 1 | 2 | 3 | 4 | 5 | 6 | 7 | 8 |
| Reaction Temp. (° C.) | 350 | 421 | 500 | 496 | 503 | 542 | 500 | 500 |
| Contact Time (sec.) | 0.05 | 0.05 | 0.1 | 0.076 | 0.025 | 0.05 | 0.01 | 0.005 |
| Mole ratio hydrocarbon to chlorine | 3.3 | 3.3 | 4.0 | 3.3 | 3.3 | 3.3 | 3.3 | 3.3 |
| Volume ratio N₂ diluent to reactants | 3.0 | 6.2 | 3.0 | 3.0 | 3.1 | 3.1 | 3.0 | 3.0 |
| Pressure, p.s.i.g. | 40 | 40 | 40 | 40 | 60 | 40 | 60 | 60 |
| Product, wt. percent: | | | | | | | | |
| 2-phenyl allyl chloride | 15.4 | 23.3 | 20.9 | 28.4 | 30.9 | 27.3 | 27.9 | 23.4 |
| 1-chloro-2-phenyl propene-1 | 5.6 | 2.7 | 0.9 | 0.5 | 0.6 | 0.24 | 0.7 | 3.1 |
| β-Chloro-β-methyl styrene | 1.0 | 0.5 |  | 0.2 | 0.2 | 0.1 |  |  |
| Dichlorides | 18.4 | 10.9 | 8.4 | 4.9 | 6.0 | 6.4 | 9.0 | 14.4 |
| Weight ratio of 2-phenyl allyl chloride to 1-chloro-2-phenyl propene-1 and β-chloro-β-methyl styrene | 2.3/1 | 7.3/1 | 23/1 | 41/1 | 39/1 | 80/1 | 40/1 | 7.61 |
| Weight ratio of 2-phenyl allyl chloride to dichlorides | 0.84/1 | 2.1/1 | 2.5/1 | 5.8/1 | 5.1/1 | 4.3/1 | 3.1/1 | 1.6/1 |

The data of the table illustrates the importance of the reaction temperatures and contact times in the present invention insofar as obtaining high selective yields of 2-phenyl-allyl chloride are concerned. Runs 1 and 2 show that the contact times of the present invention with lower temperature give considerable by-product formation. Run 8 shows that use of a contact time less than about 0.01 even at the high temperatures of the invention also gives considerable by-product formation. Runs 3 to 7 represent the process of the present invention and illustrate the surprisingly selectivity to 2-phenyl-allyl chloride provided.

We claim:

1. The method of preparing 2-phenyl-allyl chloride which comprises reacting in the vapor phase α-methyl styrene with chlorine at a temperature of about 475° C. to 550° C. and for a contact time of about 0.01 to 0.1 second.

2. The method of claim 1 wherein a molar ratio of alpha-methyl styrene to chlorine of about 2 to 5/1 is fed to the reaction zone.

References Cited

UNITED STATES PATENTS

| | | | |
|---|---|---|---|
| 2,130,084 | 9/1938 | Groll et al. | 260—651 X |
| 2,981,758 | 4/1961 | Hoffenberg | 260—651 X |
| 3,100,232 | 8/1963 | Keith et al. | 260—651 |

OTHER REFERENCES

Hatch et al.: J. Amer. Chem. Soc., vol. 76, 1954, pp. 2705–7.

Tiffeneau: "Annales de Chimie et de Physique," $8^E$, vol. 10, 1907, p. 166.

LEON ZITVER, *Primary Examiner.*

H. MARS, K. V. ROCKEY, *Assistant Examiners.*